United States Patent [19]

Farlow

[11] Patent Number: 4,895,381

[45] Date of Patent: Jan. 23, 1990

[54] FURNITURE DISPLAY CART

[76] Inventor: Clifford B. Farlow, P.O. Box 1858, High Point, N.C. 27261

[21] Appl. No.: 214,650

[22] Filed: Jul. 1, 1988

[51] Int. Cl.⁴ ............................. B62B 3/02; A47F 7/00
[52] U.S. Cl. ............................. 280/33.997; 280/35; 280/47.35; 108/106; 108/148; 211/27; 211/190; 211/208
[58] Field of Search ............ 280/47.35, 638, 35, 280/33.99 R, 33.99 S, 33.991, 33.997; 211/194, 208, 190, 27; 108/106, 148

[56] References Cited

U.S. PATENT DOCUMENTS

| | | | |
|---|---|---|---|
| 905,163 | 12/1908 | Finney et al. | 211/27 |
| 972,447 | 10/1910 | Harper | 211/27 |
| 1,966,751 | 7/1934 | Brefeld | 211/27 X |
| 2,713,424 | 7/1955 | Thompson | 211/27 |
| 2,805,776 | 9/1957 | Levitin | 211/27 |
| 3,104,626 | 9/1963 | Brunette | 108/106 |
| 3,462,166 | 8/1969 | Fuhrmann | 280/33.997 |
| 3,897,876 | 8/1975 | Feldman | 211/27 |
| 4,145,044 | 3/1979 | Wilson et al. | 403/379 |

FOREIGN PATENT DOCUMENTS

| | | | |
|---|---|---|---|
| 666493 | 11/1965 | Belgium | 211/194 |
| 795638 | 10/1968 | Canada | 211/208 |

Primary Examiner—Charles A. Marmor
Assistant Examiner—Tamara L. Finlay

[57] ABSTRACT

A furniture display cart is provided which allows vertical placement of furniture and display items to maximize warehouse or showroom capacity. The utilization of carts having vertical adjustable frames for three or more furniture items transforms a relatively small floor space into a much effectively larger space thus utilizing the area to its maximum potential. The cart is movable and can be nestled for storage purposes when not in use.

9 Claims, 4 Drawing Sheets

FURNITURE DISPLAY CART

BACKGROUND OF THE INVENTION

1. Field of the Invention

The present invention relates to carts for transporting furniture articles such as chairs, loveseats and sofas and which ca also be used as a display rack.

2. Description of the Prior Art and Objectives of the Invention

Hand trucks and carts have long been used in the wholesale and retail furniture businesses to transport furniture in warehouses and display rooms and throughout furniture stores. Store owners know that by offering customers a greater selection of furniture sales will increase as will profits. One fixed cost for most retail furniture stores is the rental of floor space. Consequently, large items such as sofas and loveseats require extended floor space for adequate displaying thus raising the consumer's cost and reducing the owner's profit per unit of furniture shown. Certain store owners in the past have used racks which are mounted on walls or which are freestanding to provide "stackable" displaying. Because of the permanent nature of conventional furniture racks and their lack of versatility and also due to the somewhat unrealistic presentation of furniture, store owners and potential customers have not been entirely pleased with the results. Thus, with the need of store owners to reduce their overhead cost per unit of furniture shown and with the need for a realistic, natural display or presentation to the customer, the present invention was conceived and one of its objectives is to provide a cart which can be rolled by a single worker to a specific location within a display area, and upon which two or more furniture pieces can be placed and displayed in vertical or "stacked" fashion.

It is another objective of the present invention to provide a display cart which will allow the displayed furniture to substantially hide the cart thus providing a more realistic appearance for the customer.

It is still another objective of the present invention to provide a display cart which can be moved within the display area with furniture thereon and which can be nested for storage purposes.

It is also an objective of the present invention to provide a display rack with adjustable frames which can be moved vertically to accommodate a variety of furniture having different dimensions.

It is yet still another objective of the present invention to provide a display rack which is relatively inexpensive to manufacture and economical to purchase for the store owner yet which will effectively increase the store display area thereby reducing the overhead cost per furniture unit displayed.

SUMMARY OF THE INVENTION

The aforesaid and other objectives are realized by a multi-tiered display cart which can be moved by a single employee as a result of a plurality of casters affixed thereto. The display cart can be used for three separate pieces of furniture and includes a base frame which is somewhat wedge-shaped and is mounted to a pair of rear vertical stanchions. An upper frame is affixed to a pair of stanchion sleeves which are slidably positioned on the stanchions and can be adjustably positioned therealong. Stanchion pins allow the upper frame to be "locked" at a suitable height above for example a chair or sofa which may be displayed on the base frame. A top frame is attached to a pair of stanchion inserts which are slidably received into the top ends of the stanchions and stanchion locking pins also maintain the top frame at a desired height. Top frame is angularly disposed relative to the stanchion inserts so a customer or others may view furniture which is positioned on the top frame fully while standing in front of the cart as said furniture is tilted towards the viewer. The display cart of invention is designed so it can be nested with similar carts for compact storage when not in use.

DESCRIPTION OF THE PREFERRED EMBODIMENT

Figure 1:
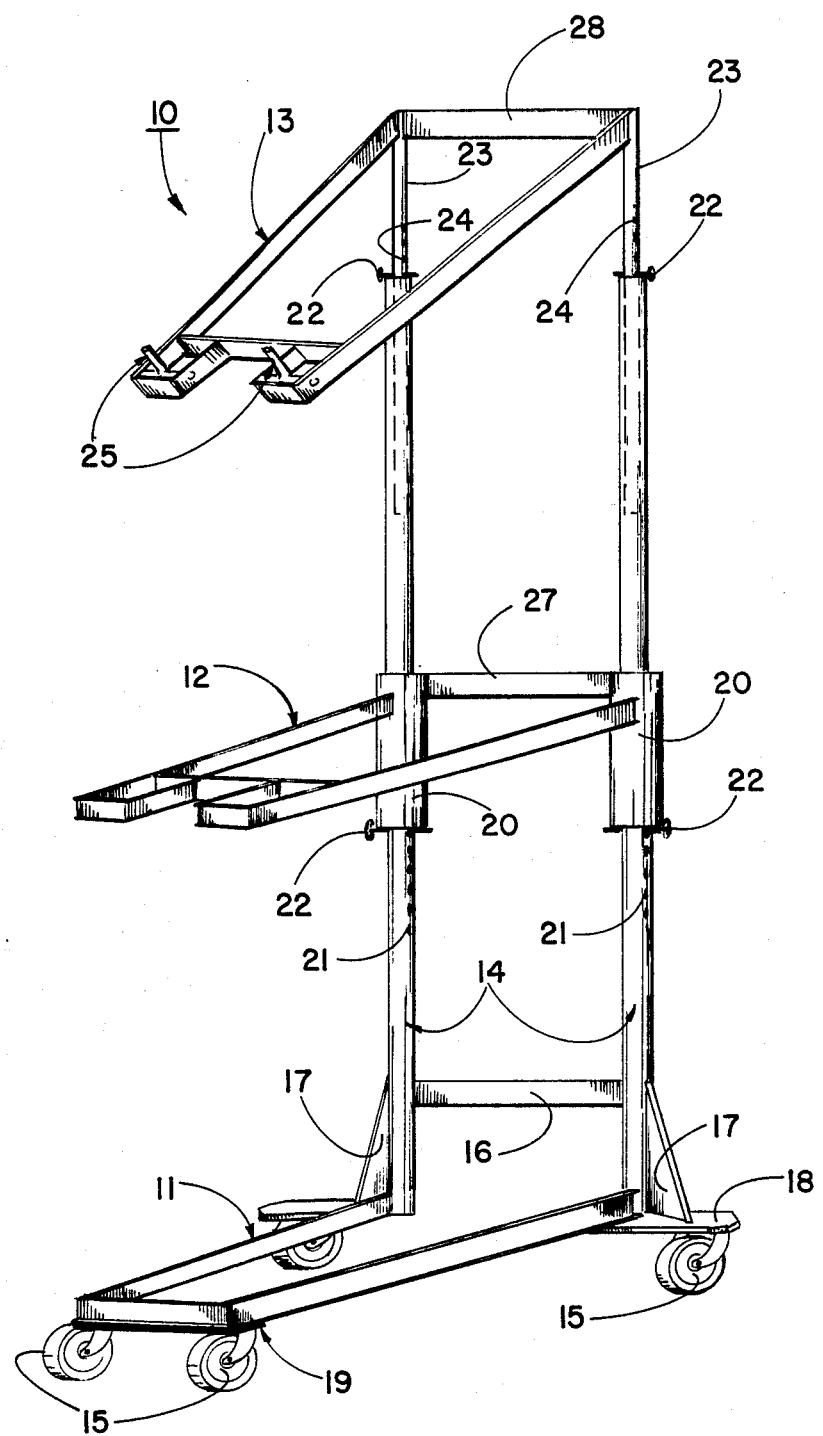
FIG. 1 is a front perspective view of the display cart of the invention.

The preferred form of the invention is shown in FIG. 1 which demonstrates a three tier furniture display cart and rack having upper and top frames adjustably movable along rear vertical stanchions. The lower or base frame is affixed to the stanchions and includes a plurality of casters for moving the cart with or without furniture thereon. The top frame being angularly disposed relative to the vertical stanchions includes restraints at the forward end thereof which can be rotated upwardly to prevent items positioned on the top frame from sliding. The frames of the preferred embodiment are formed from channel steel for durability. The upper frame is joined to a pair of stanchion sleeves which provides adjustability along the stanchions and stanchion locking pins secure the sleeves at any desired location. The top frame is affixed to a pair of stanchion inserts which are positionable and telescope within the stanchions and stanchion locking pins likewise are employed to hold the top frame at the desired height. The rear width of the display cart is approximately 30 inches and the front width is approximately 13 inches. The depth of the frames are approximately 33 inches with an overall height adjustable from approximately 5½ feet to 8 feet when the top frame insert is fully extended. As earlier mentioned the display carts of the invention can be nestled for compact and convenient storage when not in use.

DETAILED DESCRIPTION OF THE DRAWINGS AND OPERATION OF THE INVENTION

Figure 5:
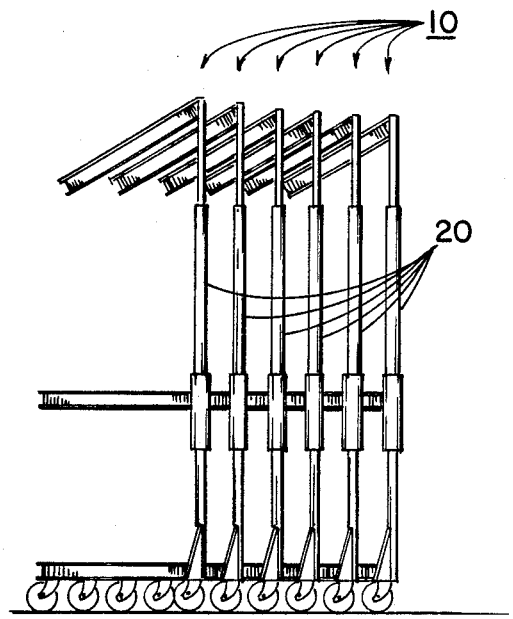
FIG. 5 demonstrates a view of several of the carts of the invention in nestled storage.

Turning now to the drawings, FIG. 1 demonstrates a three tier furniture cart 10, which when not in use, may be conveniently stored in a nestled configuration as shown in FIG. 5. Display cart 10 includes base frame 11, upper frame 12 and top frame 13. All three frames are joined to and supported by rear stanchions 14 and are capable of holding relatively large pieces of furniture such as sofas, loveseats, chairs and the like for display purposes as further shown in FIG. 2.

Figure 3:
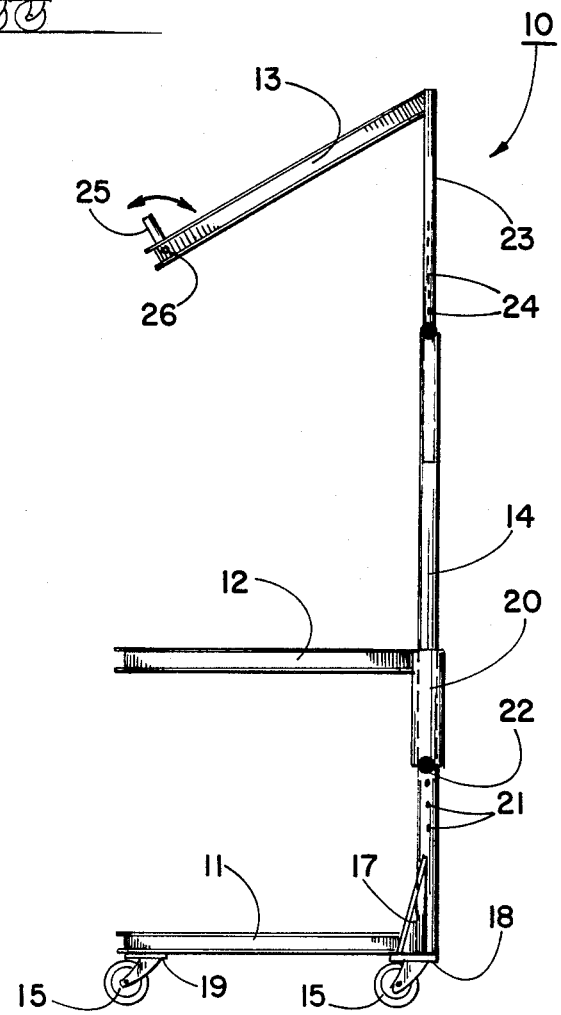
FIG. 3 is the side elevational view of the cart as shown in FIG. 1.
Figure 4:
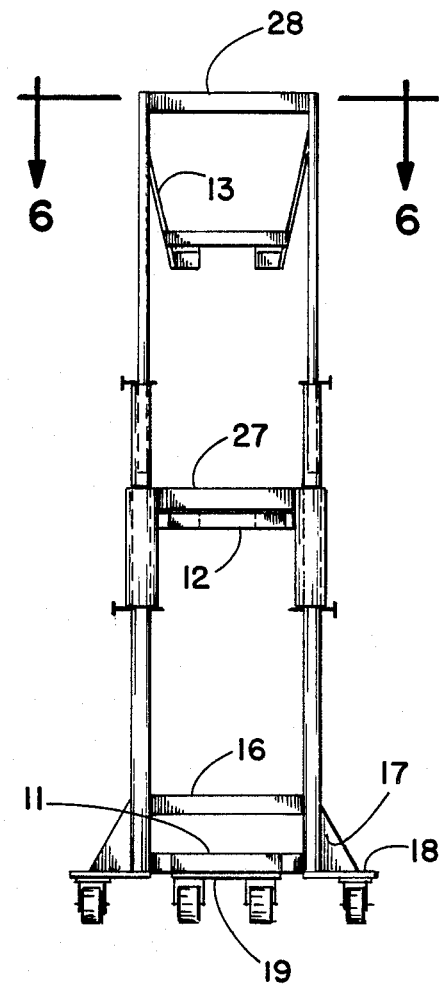
FIG. 4 is a rear elevational view of the cart.

Base frame 11 is affixed to four casters 15 which will allow a single employee to roll cart 10 in a warehouse or display showroom as needed with minimal effort. As seen in FIG. 1 base support 16 is attached to stanchions 14 and is positioned vertically above base frame 11 as shown in FIG. 4 thereby allowing carts 10 to nest as earlier mentioned. Stanchion gussets 17 as shown in FIG. 4 are disposed at a forward angle on rear caster plates 18 as seen in FIG. 3. The angular disposition of gussets 17 provide additional strength and rigidity for stanchions 14 when sofas or other large furniture items are displayed on upper frame 12 and top frame 13. Front caster plate 19 spans base frame 11 and is rigidly joined thereto.

Figure 2:
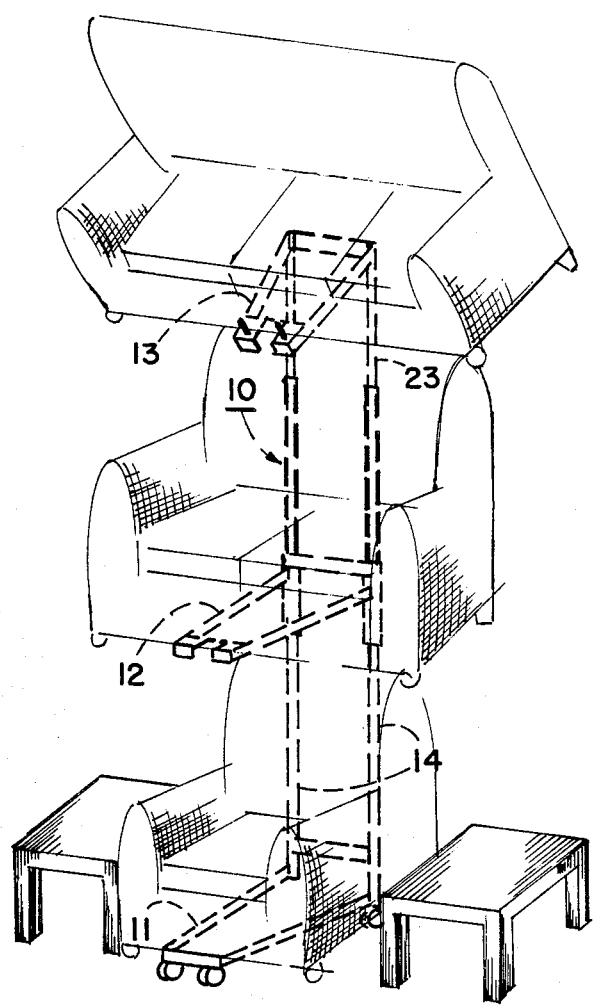
FIG. 2 is a front perspective view of the cart as shown in FIG. 1 but with furniture positioned thereon.

As illustrated in FIG. 2, display cart 10 is practically invisible and provides a substantially realistic furniture presentation for the purchasing public. The overhang of conventional furniture "skirts" substantially conceals frames 11, 12 and 13 upon which the furniture is placed and the back of the furniture substantially conceals stanchions 14 and stanchion inserts 23. In addition, a practical floor display is provided demonstrating a chair with end tables in a pleasing natural setting.

The adjustable features of display cart 10 can be understood from FIG. 3 whereby upper frame 12 is affixed to a pair of stanchion sleeves 20 which are slidable over stanchions 14. Stanchions 14 define a series of lower apertures 21 through which locking pins 22 are positionable. Thus, sleeves 20 are placed over stanchions 14 and are raised or lowered as required. Once the bottoms of sleeves 20 are at a desired height along stanchion 14, pins 22 are inserted in desired apertures 21 and sleeves 20 then rest thereon. Pins 22 can be removed as desired and upper frame 12 can be further raised or lowered as needed.

Top frame 13 is likewise adjustable along stanchions 14 in that stanchion inserts 23 may be for example 36 inches in length and may have an outside diameter of 1½ inches with insert apertures 24 spaced at 2 inch increments therealong. Apertures 24 may be for example ⅜ inch in diameter as are apertures 21 in stanchions 14. Stanchions 14 may have an outside diameter of approximately 2 inches with stanchion sleeves 20 having an inside diameter slightly larger than 2 inches to slidably move therealong. The inside diameters of stanchions 14 are slightly greater than 1½ inches whereby stanchion inserts 23 are slidable therein and as would be understood, stanchion inserts 23 can be raised or lowered as required. With stanchion pins 22 inserted into apertures 24, top frame 13 is then "locked" at a suitable height.

Figure 6:
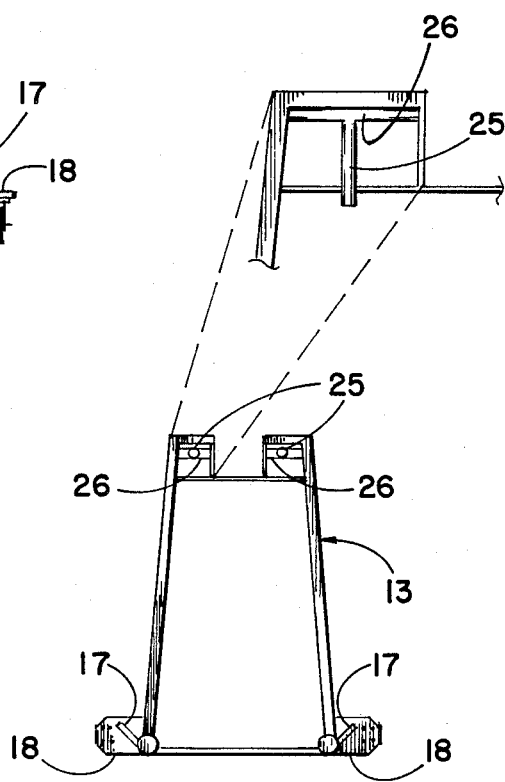
FIG. 6 is an enlarged top plan view of a section of the top frame showing the furniture retainers.

As further shown in FIG. 3, top frame 13 is angularly disposed to insert 23 and stanchion 14 in order for a customer to better view furniture which is positioned thereon. As would be understood, top frame 13 may be positioned for example 7 feet from the floor and thus a customer of normal height would have difficulty in seeing the furniture thus displayed at a close range. The angular disposition of top frame 13 which may be for example a 30 degree angle from the horizon will provide a good view of the furniture displayed. Also, top frame 13 includes a pair of pivotal retainers 25 which can be raised as shown in FIG. 3 to prevent heavy furniture items such as sofas from sliding along top frame 13. Pivotal retainers 25 are mounted on rotatable retainer axles 26 as shown in FIG. 6 and may be manually raised by rotation as required. Display cart 10 can be formed rom steel or other suitable materials.

Base support 16 in FIG. 4 is shown above base frame 11 and upper support 27 is seen vertically above upper frame 12 and upper support 27 is mounted on and affixed between stanchion sleeves 20. Top support 28 is also shown in FIG. 4 vertically above top frame 13. As explained earlier this particular configuration of the supports above the relative frames and with the frames being substantially wider at the rear than at the front allows for nesting of the display carts 10 as earlier mentioned.

The illustrations and examples provided herein are for explanatory purposes and the invention can be modified for example by having additional frames attached to stanchions 14 for display of more furniture items. Thus, the particular structures shown are for explanatory purposes and are not intended to limit the invention beyond the scope of the appended claims.

I claim:

1. A furniture display cart comprising: a base frame for supporting furniture, a plurality of casters, said casters attached to said base frame, said casters for moving said cart, a pair of stanchions said base frame being somewhat wedge-shaped, said base frame attached to said pair of stanchions, an upper frame for supporting furniture, means for adjusting said upper frame along said stanchions, said adjusting means including a pair of stanchion sleeves, said sleeves affixed to said upper frame for sliding over said stanchions, and stanchion locking means, said locking means for releasably fixing said sleeves along said stanchions, said base frame and said pair of stanchions forming an opening between said pair of stanchions, whereby two or more carts can be nestled for compact storage when not in use and during use furniture can be placed on said base frame and said upper frame for display purposes.

2. A furniture display cart as claimed in claim 1 and including a top frame.

3. A furniture display cart as claimed in claim 2 including a stanchion insert connected to said top frame, wherein said stanchion insert defines a plurality of pin apertures.

4. A furniture display cart as claimed in claim 3 wherein said top frame is angularly, downwardly disposed to said stanchion insert.

5. A furniture display cart as claimed in claim 1 wherein said stanchion defines a plurality of pin apertures.

6. A furniture display cart as claimed in claim 1 and including a rear caster plate, said caster plate affixed to said base frame, a gusset, said gusset angularly joined to said plate and affixed to said stanchion for support thereof.

7. A furniture display cart as claimed in claim 1 wherein said base frame and said upper frame are formed from channel steel.

8. A furniture display cart for simultaneously display 3 tiers of furniture comprising: a horizontal base frame, a pair of stanchions, said base frame affixed perpendicularly to said stanchions, an upper frame, means for adjustably positioning said upper frame along said stanchions, said adjusting means including a pair of stanchion sleeves, said sleeves affixed to said upper frame for sliding along said stanchion, a top frame, a pair of stanchion inserts, said inserts affixed to said top frame, means for adjusting said inserts in said stanchions, said insert adjusting means including a plurality of apertures defined in said inserts and locking pins for insertion therein, said top frame angularly, downwardly disposed to said stanchion inserts whereby said upper and said top frames can be vertically moved along said stanchions and releasably joined thereto at desired heights by said locking pins for simultaneous display of furniture on said frames.

9. A furniture display cart as claimed in claim 8 and including a plurality of casters, said casters affixed to said base frame for moving said cart.

* * * * *